United States Patent [19]

Braukmann et al.

[11] 4,046,692
[45] Sept. 6, 1977

[54] DOMESTIC WATER CONTROL UNIT

[75] Inventors: Bernhard W. Braukmann; Rudolph Vollmer, both of Mosbach, Germany

[73] Assignee: Braukmann Armaturen AG, Rothrist, Switzerland

[21] Appl. No.: 614,245

[22] Filed: Sept. 17, 1975

[51] Int. Cl.² .................................... B01D 35/14
[52] U.S. Cl. ................................ 210/108; 210/136; 210/137; 210/411; 210/426; 210/431; 210/451; 251/292
[58] Field of Search .............. 210/82, 90, 108, 136, 210/137, 232, 234, 238, 240, 251, 411, 421, 425, 426, 427, 430, 431, 448, 456; 251/292

[56] References Cited
U.S. PATENT DOCUMENTS

| | | | |
|---|---|---|---|
| 1,408,822 | 3/1922 | Mosher | 210/136 X |
| 2,400,200 | 5/1946 | Katcher | 210/411 X |
| 2,471,069 | 5/1949 | LeClair | 210/136 X |
| 2,707,051 | 4/1955 | Mailhot et al. | 210/137 |
| 3,081,876 | 3/1963 | Bizard | 210/108 X |
| 3,402,818 | 9/1968 | Sasaki | 210/82 |
| 3,421,630 | 1/1969 | Acosta | 210/411 |
| 3,532,320 | 10/1970 | Fisch | 251/292 X |
| 3,777,889 | 12/1973 | Henderson | 210/136 X |

*Primary Examiner*—Thomas G. Wyse
*Assistant Examiner*—Benoit Castel
*Attorney, Agent, or Firm*—William T. Howell

[57] ABSTRACT

A control unit is formed of a housing containing a filter with an inlet and outlet in line above the filter, the latter forming a channel with the housing; a pressure reducer is positioned between the inlet and the outlet above the filter. A rotary valve positioned between the filter and the pressure reducer reverses the flow in the unit. A plug-valve is located in the housing to provide drainage and the plug-valve is connected to the rotary valve so that on reversal of flow, the plug-valve opens to drain the unit.

3 Claims, 3 Drawing Figures

4,046,692

DOMESTIC WATER CONTROL UNIT

FIELD OF THE INVENTION

The invention relates to a domestic-water control unit having connections for a supply line from the water main and a domestic water line, an inlet-pressure gauge and an outlet pressure gauge, a filter, a pressure-reducer, and a return-flow check valve.

PRIOR ART

Units of the kind referred to above have their inlet ends connected to a water-supply line, for example the public water main, whereas the outlet ends are connected to the domestic water line or lines. The pressure reducer brings the inlet pressure down to a level suitable for the domestic water line. The said inlet and outlet pressures may be read on pressure gauges in hydraulic communication with the two connections on the unit, i.e. the inlet and the outlet connections. The filter ensures that the functioning of the pressure-reducer is not impaired by grains of sand or other contaminants. The return-flow check valve, which is located, in the direction of flow, after the outlet-pressure gauge, ensures that no return flow occurs in the event of a drop in, or total failure of, the inlet pressure.

The disadvantage of existing domestic-water control units is that the individual elements, such as filters, pressure reducers, etc., must be assembled in situ, which requires considerable technical ability and additional labour. In addition to this, existing units, as seen in the direction of the piping, are relatively lengthy and therefore require a considerable amount of room.

It is therefore the purpose of the present invention to provide a domestic-water control unit, of the type mentioned at the beginning hereof, which is easy to install and which is of short length.

SUMMARY OF THE INVENTION

This purpose is achieved, according to the invention, in that, in order to provide a unit ready for installation, the filter, the pressure- reducer, the return-flow check valve, and the two connectors all have a common housing, which also contains connecting passages for the pressure gauges connected thereto. The filter, pressure reducer, return-flow check valve, and the two pressure gauges can thus be assembled at the plant, so that the only installation work required is to connect the said common housing of the unit to the supply line from the water main and to the domestic water line. The said housing may of course, be made in several parts, the idea being that the spring cap for the pressure reducer, and the preferably cup-shaped enclosure for the filter, be detachable. Threaded connections are, of course, supplied to connect the unit to the supply line from the water main and to the domestic water line. This single housing for all the elements of the unit also makes the said unit quite compact.

The two connectors on the housing are preferably coaxial with each other.

According to another configuration of the invention, the filter is arranged substantially at right angles to the longitudinal axis of the housing and is thus at the bottom of the unit in the installed position. The size of the filter may thus be increased without affecting the length of the unit.

One particularly preferred example of embodiment of the invention is characterised in that the filter inlet and outlet are connected to the control element of a reverse-flushing device. In normal operation, the water flows through the filter in front of the pressure reducer in one direction, but when the reverse-flushing device is changed over, the water flows through the filter in the opposite direction, thus floating away any contaminants deposited on the filter. The "flushing water", and any contaminants it may contain, may be removed through an aperture arranged in the housing for the purpose, especially in the part of the housing surrounding the filter.

According to another configuration of the invention, the reverse-flushing device consists of a rotary valve which, in its operative position connects the inlet-pressure chamber in the housing with the outside of the tubular filter which is provided at least with radial passages, while the interior of the filter is connected to the pressure-reducer inlet. Thus, with the rotary valve in its operative position, the water flows radially into the filter and leaves it axially, as usual, the contaminants being deposited upon the outside of the cylindrical screen. During reverse-flushing the interior of the tubular filter is connected to the supply line from the water main, and the water therefore flows radially through the filter from inside to outside, thus washing away the contaminants deposited on the outside. The resulting contaminated water, which is initially located in the cylindrical cavity between the filter and its housing, is preferably removed, as stated above, through an aperture in the said housing, fitted with a drain plug. The rotary valve must, of course, be appropriately sealed, and the flow passages therein must be of a size, and must be arranged in a manner, such that they allow the water to flow through the filter in opposite directions, when said valve is in its two terminal positions of rotation, in co-operation with corresponding passages in the housing. In this connection, it is of particular advantage to mount the said valve rotatably, directly in the control-unit housing, with the actuating lever passing through the said housing to the outside.

According to another variant of the invention, the said actuating lever is detachable and may be fitted to the rotary valve in one of the two positions of rotation thereof, for each of which a slot is provided in the housing. Thus, if the lever is inserted, through one slot in the housing, into one attachment thread on the rotary valve, then the unit may be installed left-handed for example, whereas if the unit is to be installed right-handed, then the lever is inserted through the other slot in the housing and into the other attachment thread on the valve. If the said rotary valve is arranged concentrically with the filter, and especially to the longitudinal axis of the pressure reducer, the actuating lever will run in a horizontal direction when the control unit is installed and will also pivot in a horizontal plane. The two slots in the housing may be immediately adjacent to each other, and the ends may be used as stops for the rotary valve. In the case of left-handed assembly, the rotary valve may be from right to left for reverse-flushing; if the assembly is right-handed, then the valve will be moved from left to right. Thus the distance between the two attachment locations on the rotary valve is substantially equal to the distance between the two slots in the housing.

Another characteristic of the invention may consist in that the rotary valve is connected to a rotary closure element, especially a plug-valve, in the housing, in which case the operative position of the rotary valve in rotation is associated with the closed position of the plug-valve. This means that when the rotary valve is changed over from the operative to the reverse-flushing position, the plug-valve is simultaneously moved from the closed to the open position. This eliminates the need for any special measures for draining the contaminated water during reverse-flushing. In this connection, it is particularly desirable to arrange the said plug-valve coaxially with the rotary valve at the bottom of the part of the housing surrounding the filter, and to connect the two valves together by means of a rod passing axially through the filter.

According still another characteristic of the invention, the rotary-valve actuating lever may run, when the said valve is in its operative position in rotation, in the direction of the connector for the domestic-water line, with the reverse-flushing position at 90° thereto. This conspicuous arrangement of the actuating lever and the "drain line" makes it possible to see, from some distance away, whether the rotary valve is in its operative position or its reverse-flushing position. Moreover, if the actuating lever is placed as closely as possible to the domestic-water line, the danger of injury and inadvertent rotation of the rotary valve is effectively eliminated.

Additional advantages and configurations of the invention may be gathered from the following illustrated description.

BRIEF DESCRIPTION OF THE DRAWINGS

An example of embodiment of the invention is illustrated in the drawing attached hereto, wherein.

DESCRIPTION OF A PREFERRED EMBODIMENT

Figure 1:
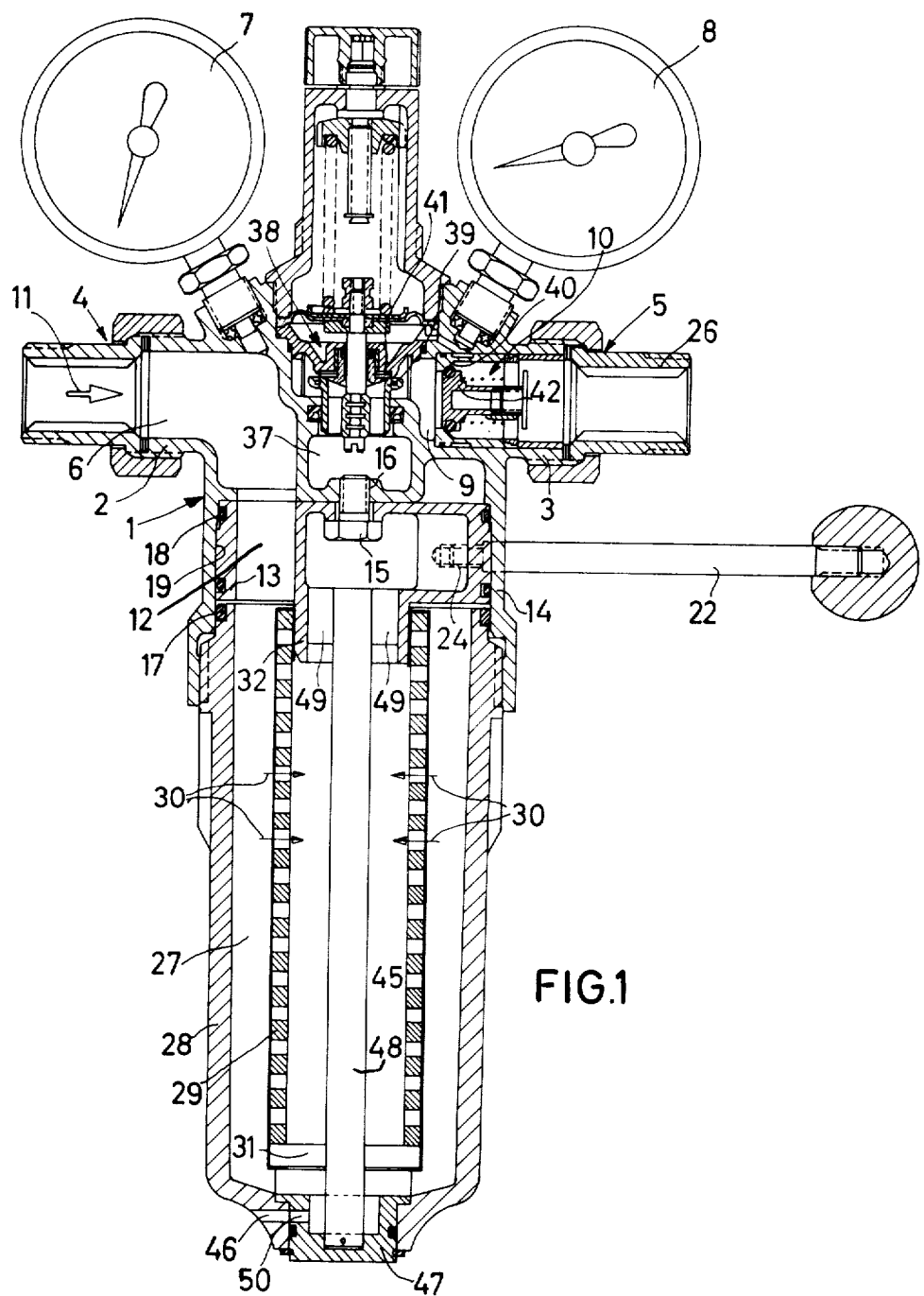
FIG. 1 shows a central vertical section through the domestic-water control unit according to the invention, with the rotary valve in its operative position.

Housing 1 of the domestic-water control unit according to the invention has a connector 2 for a supply line from the water main, not shown, and another connector 3 for a domestic-water line, also not shown, the connections being made by means of threaded unions 4, 5. The pressure obtaining in inlet passage 6 is shown on inlet-pressure gauge 7, while the pressure obtaining in outlet passage 9, in front of return-flow check valve 10, is shown on outlet-pressure gauge 8. The water therefore flows into the unit according to the invention in the direction of arrow 11. The water passes initially through a vertical passage 12 in a rotary valve 13 which is mounted rotatably in main part 14 of housing 1. The said valve is secured axially by means of a sealed central screw 15 which is screwed into a corresponding thread 16 in the housing. Sealing is achieved by means of two resilient rubber rings 17 and 18 in spaced relationship to each other, fitted in corresponding grooves in rotary valve 13, and co-operating with stepped cylindrical surface 19 of the said housing. Sealing ring 18 is located above the two slots 20, 21 arranged in extension of each other, cast or machined into main part 14, and extending through about 90°. These slots allow for the passage of actuating lever 22 which may be screwed selectively into one of two threaded holes 24 (FIG. 1) provided in the rotary valve at a distance 23 from each other. This makes it possible to rotate the said valve, from connecting web 25, between slots 20, 21 through about 90°, to the left or right, depending upon which of the two threaded holes 24 the said actuating lever is screwed into. This makes the unit according to the invention suitable for right or left-handed installation. When actuating lever 22 lies parallel with sleeve 26, i.e. with the outlet passage from the control unit, the rotary valve is in its operative position of rotation, whereas if the said lever is at right-angles to the plane of the figure, the said valve is in reverse-flushing position.

Figure 3:
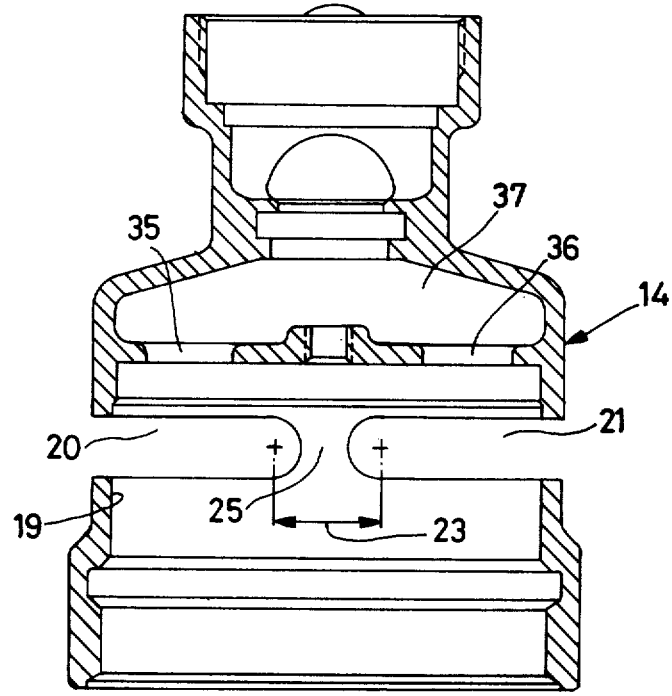
FIG. 3 is a section, corresponding to that in FIG. 2, through the main part of the domestic-water control unit.
Figure 2:
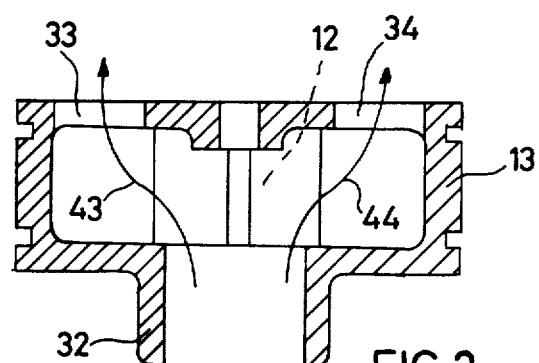
FIG. 2 shows a section through the rotary valve at right angles to the plane of FIG. 1.

In the operative position of rotation of valve 13 shown in FIG. 1, the incoming water flows through passage 12 into annular space 27, formed, on the one hand, by the cup-shaped lower portion 28 of the housing and, on the other hand, by the cylindrical casing of filter 29, through which the water flows in a radial direction 30 from outside to inside. Bottom 31 of the said filter has no water passages. The top of the filter is mounted sealingly upon a spigot-shaped extension 32 of rotary valve 13, through the interior of which the water flows, in the direction of the arrows shown in FIG. 2, through the two kidney-shaped openings 33, 34 (FIG. 3) and through openings 35, 36 which are in alignment with the latter openings when the rotary valve is in its operative position, into housing chamber 37 (FIGS. 1 and 3) which also constitutes the inlet-pressure chamber of pressure reducer 38. After flowing through valve seat 39 of pressure reducer 38, the water passes, at a suitably reduced pressure, into outlet passage 9. It then flows through valve seat 40 of return-flow check valve 10 and finally reaches the domestic water line, not shown. At this time, closure element 41 of pressure reducer 38 and 42 of return-flow check valve 10 are, respectively, in their partly or fully open positions.

When rotary valve 13 is in the reverse-flushing position of rotation, either opening 33 or opening 34 in the said valve will be in hydraulic communication with inlet passage 6, depending upon the direction in which the said valve has been rotated, and passage 12 will therefore be associated either with opening 35 or with opening 36 in main housing passage 14. In this case, the water flows through rotary valve 13 in a direction opposite to that of arrows 43 or 44, and thus passes initially into the interior of filter 29. It then flows radially through the said filter, from inside to outside, in a direction opposite to that of the arrows and thus enters annular chamber 27. Particles of dirt on external surface 45 of filter 29 are thus loosened and mixed with the emerging water, and this contaminated water may be drained in some suitable manner.

It is not desirable to drain contaminated water through outlet passage 9, since it might contaminate both pressure reducer 38 and return-flow check valve 10, which is precisely what filter 29 is intended to prevent. It is therefore desirable that cup-shaped housing part 28 shall have at least one drain aperture 46, as shown in FIG. 1 displaced through an angle of 90°. This drain aperture, or apertures, is closed or, in the reverse-flushing position, is opened by means of a plug-valve 47, or the like, mounted rotatably in lower part 28 of the housing and suitably sealed.

In one particular example of embodiment of the invention, plug-valve 47 is connected to rotary valve 13 by means of a rod 48, the said connection being made by ribs 49 or by some other means. Each drain aperture 46 is associated with a hole 50 in plug-valve 47.

The control unit according to the invention may be made relatively short in length by moving filter 29 to the bottom of housing 1 and locating pressure reducer 38 at the top of the housing. All elements are easily accessible and may therefore easily be serviced, repaired, or replaced. Pressure reducer 38 and return-flow check valve are of conventional design.

In connection with the latter, it should be noted that valve seat 40 is moulded into a housing sleeve 51. This permits complete pre-assembly of the said valve and also makes it easy to replace.

We claim:

1. A domestic water control unit comprising a housing, a filter located in said housing to provide a channel, an inlet and an outlet in line in said housing above and normal to said channel, a pressure reducer between said inlet and said outlet above said filter, a check valve in said outlet, the normal flow from said inlet being along said channel through said filter and then through said check valve to said outlet, a rotary valve between said filter and said check valve movable from a first position in which it receives said normal flow to a second position to reverse the flow from said inlet through said filter and then into said channel and a plug valve to said housing, connected to said rotary valve and responsive thereto, the arrangement being such that on normal flow the plug valve is closed but on reverse flow through operation of said rotary valve, the latter opens said plug valve to drain said unit, said rotary valve and said plug valve being co-axial and connected by means of a rod which passes axially through said filter.

2. A water control unit according to claim 1 wherein said rotary valve has an actuating lever, said lever passing through said housing to the outside thereof, said housing has a pair of spaced apart slots and said lever is detachable, each slot being adapted to receive said lever for attachment to said rotary valve.

3. A water control unit according to claim 2, wherein said lever in the normal flow condition of the unit is in line with said inlet and in the reverse flow condition is at about 90° thereto.

* * * * *